US012623632B2

(12) United States Patent
Morris et al.

(10) Patent No.: US 12,623,632 B2
(45) Date of Patent: May 12, 2026

(54) THEFT EVENT DETECTION AND CLASSIFICATION

(71) Applicant: The Goodyear Tire & Rubber Company, Akron, OH (US)

(72) Inventors: Brian Richard Morris, Canton, OH (US); Micah John Thorn, Canton, OH (US); Mateusz Andrzej Guzek, Helmsange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 26 days.

(21) Appl. No.: 18/639,214

(22) Filed: Apr. 18, 2024

(65) Prior Publication Data

US 2024/0425015 A1      Dec. 26, 2024

Related U.S. Application Data

(60) Provisional application No. 63/509,101, filed on Jun. 20, 2023.

(51) Int. Cl.
B60R 25/34 (2013.01)
(52) U.S. Cl.
CPC .................................. B60R 25/34 (2013.01)
(58) Field of Classification Search
CPC .... B60R 25/34; B60R 25/1004; B60R 25/102
See application file for complete search history.

(56) References Cited

U.S. PATENT DOCUMENTS

| | | | |
|---|---|---|---|
| 7,535,345 | B2 | 5/2009 | Tanaka et al. |
| 8,339,251 | B2 | 12/2012 | Roberts, Sr. et al. |
| 9,649,895 | B2 | 5/2017 | Mccormick et al. |
| 9,649,896 | B1 * | 5/2017 | Lin ..................... B60C 23/0486 |
| 9,669,801 | B2 | 6/2017 | Utter et al. |
| 9,738,254 | B2 | 8/2017 | Shigetomi |
| 10,131,320 | B2 | 11/2018 | Schmotzer et al. |
| 10,131,362 | B1 * | 11/2018 | Gingrich ............... B60W 40/08 |
| 12,067,854 | B2 * | 8/2024 | Engels .................. G01M 17/02 |
| 12,377,812 | B2 * | 8/2025 | Stewart ............... B60C 23/0401 |

(Continued)

FOREIGN PATENT DOCUMENTS

DE         102008018016 A1    10/2009

*Primary Examiner* — Nay Tun
(74) *Attorney, Agent, or Firm* — Edward T. Kennedy

(57) ABSTRACT

Disclosed are various embodiments related to theft event detection and classification of theft of tires and/or wheels on a vehicle, such as a semi-tractor, semi-trailer. A theft event detection and classification system can include at least one computing device including a vehicle computing device comprising an accelerometer. The system can also include tire sensors, corresponding to tires on the vehicle, and in data communication with the vehicle computing device. The system can execute a theft monitoring application to detect vibration signals by the accelerometer and generate an event data record comprising the vibration signal information, tire sensor records comprising retrieved sensor information, and a vehicle environment record. The theft event detection and classification system can execute a theft detection application to analyze the event data record to classify the event and a notification of the possible theft event.

16 Claims, 3 Drawing Sheets

(56) References Cited

U.S. PATENT DOCUMENTS

| | | | | |
|---|---|---|---|---|
| 2004/0217849 A1* | 11/2004 | Maehara | ............. | B60R 25/1004 |
| | | | | 340/426.1 |
| 2007/0222564 A1* | 9/2007 | Kobayashi | .......... | B60R 25/1004 |
| | | | | 340/429 |
| 2015/0310742 A1* | 10/2015 | Albornoz | ......... | G08G 1/096716 |
| | | | | 340/905 |
| 2015/0314752 A1* | 11/2015 | Shigetomi | ........... | B60C 23/0479 |
| | | | | 340/426.18 |
| 2016/0075306 A1* | 3/2016 | Utter | ................... | B60C 23/0408 |
| | | | | 340/426.31 |
| 2018/0186335 A1* | 7/2018 | Chuang | ................. | B60R 25/102 |
| 2018/0367731 A1* | 12/2018 | Gatti | ................... | H04N 21/4223 |
| 2020/0001828 A1 | 1/2020 | Loeffler et al. | | |
| 2022/0402458 A1* | 12/2022 | Gilbert-Eyres | ......... | G01S 15/88 |
| 2022/0410839 A1* | 12/2022 | Weston | ................. | B60R 25/245 |
| 2023/0415700 A1* | 12/2023 | Canal | ...................... | B60R 25/32 |
| 2024/0174033 A1 | 5/2024 | Morris et al. | | |

* cited by examiner

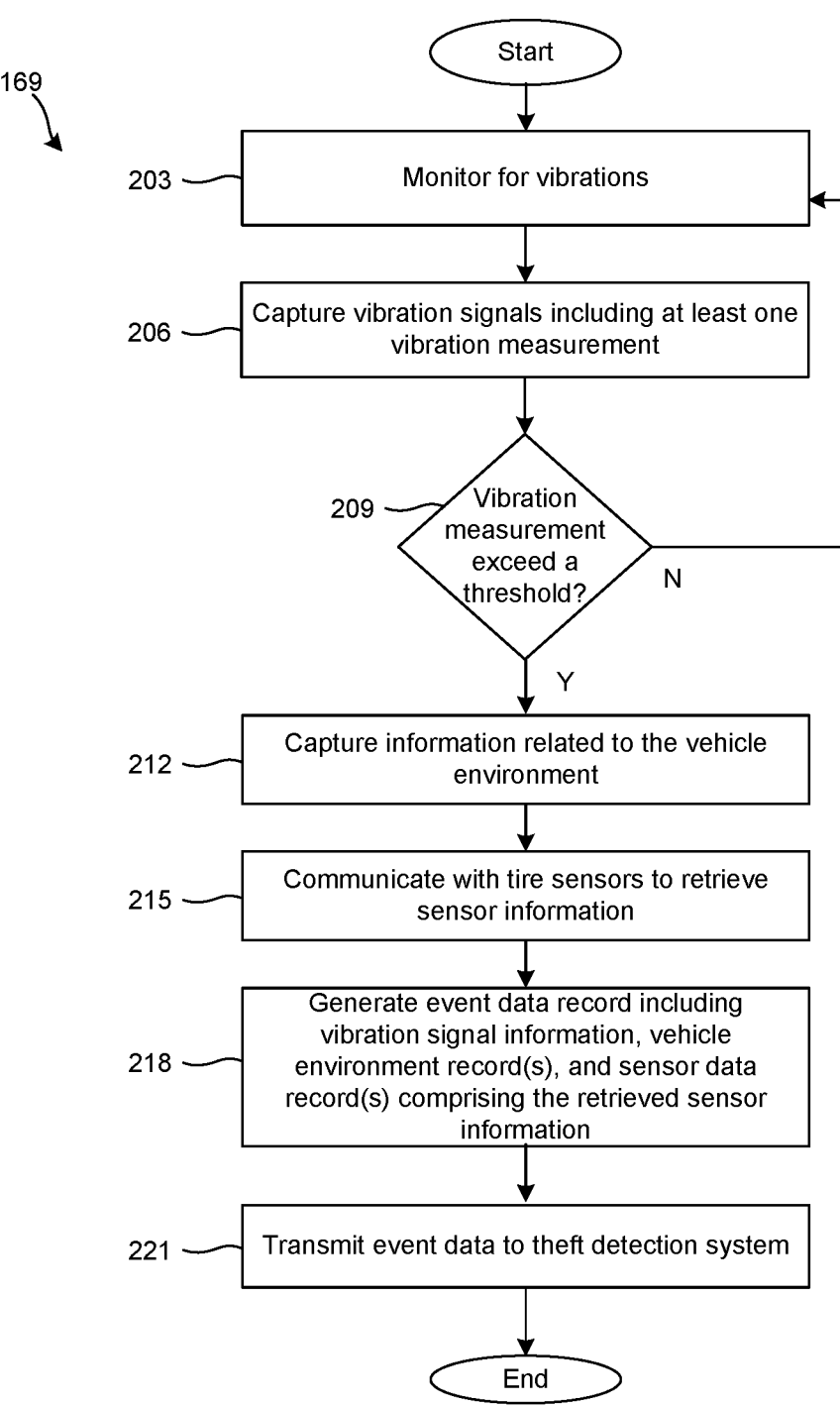

169

203 — Monitor for vibrations

206 — Capture vibration signals including at least one vibration measurement

209 — Vibration measurement exceed a threshold?

N

Y

212 — Capture information related to the vehicle environment

215 — Communicate with tire sensors to retrieve sensor information

218 — Generate event data record including vibration signal information, vehicle environment record(s), and sensor data record(s) comprising the retrieved sensor information 221 — Transmit event data to theft detection system

FIG. 2

THEFT EVENT DETECTION AND CLASSIFICATION

BACKGROUND

Semi-trucks are large transportation vehicles that transport a load from a first location to a second location. A semi-truck can represent a semi-tractor for pulling a semi-trailer, in which the semi-trailer contains the load. In some scenarios, the owner of the semi-tractor may not own the semi-trailer. The semi-tractor can be used to haul different semi-trailers to various destinations. In some instances, a semi-trailer can be situated at a location waiting for a semi-tractor to arrive and deliver the semi-trailer to another location. After the semi-trailer has been used to deliver the load, the semi-trailer may be stored in a facility until it is needed for another delivery.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 is a flowchart illustrating one example of functionality implemented as portions of a theft monitoring application executed in a computing environment in the networked environment of FIG. 1 according to various embodiments of the present disclosure.

DEFINITIONS

Figure 1:
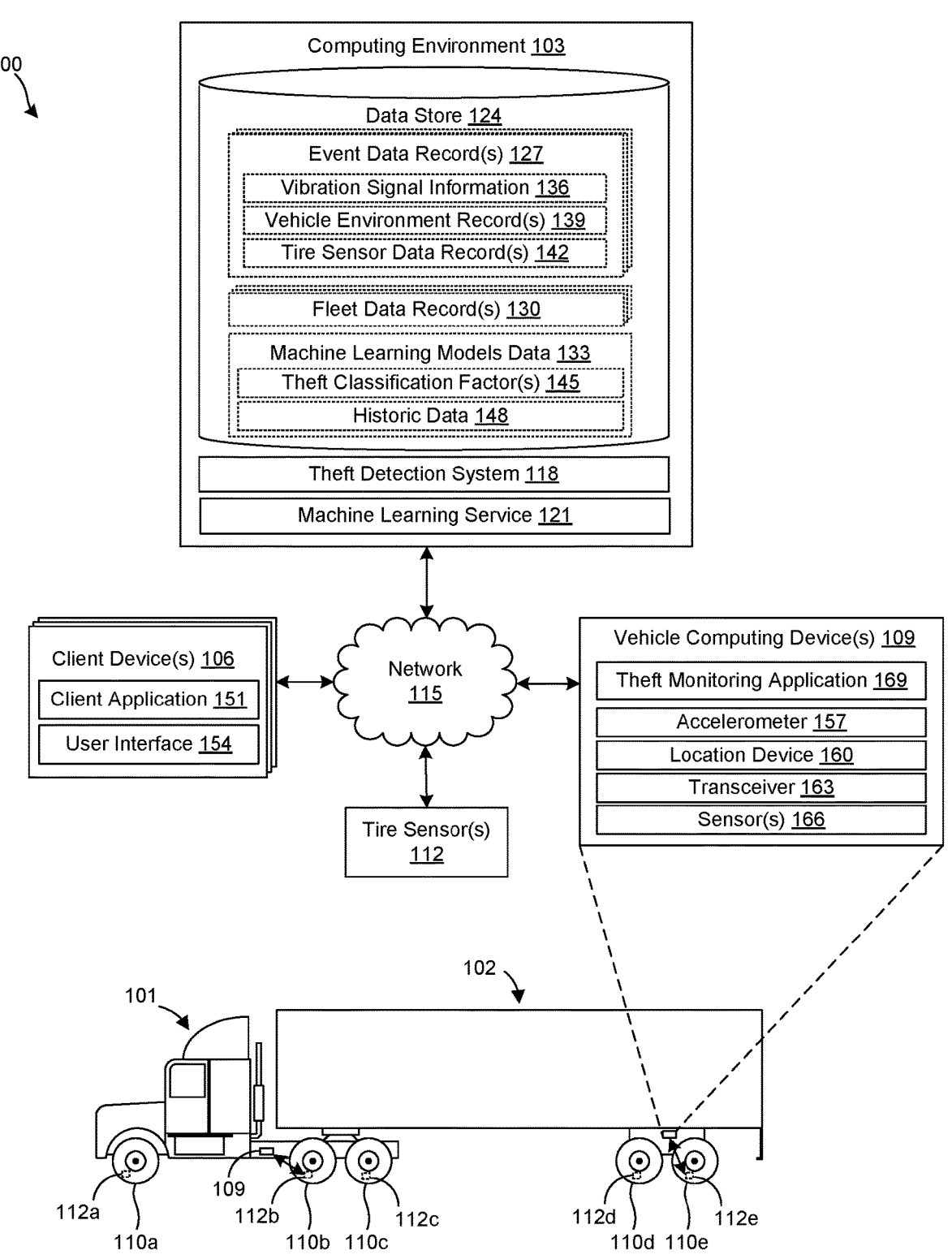
FIG. 1 is a drawing of a network environment according to various embodiments of the present disclosure.

"TPMS" means a tire pressure monitoring system, which is an electronic system that measures the internal pressure of a tire and is capable of communicating the pressure to a processor that is mounted on the vehicle and/or is in electronic communication with electronic systems of the vehicle and/or the trailer computing device.

DETAILED DESCRIPTION

The present disclosure relates to theft event detection and classification related to a vehicle in accordance to various embodiments. As a non-limiting example, a vehicle can be a semi-truck, which can refer a tractor vehicle (also referred to as "semi-tractor vehicle," "semi-tractor," "tractor" herein) that pulls a semi-trailer (also referred to as "trailer vehicle" or "trailer" herein). Although a trailer generally does not have front axle or engine, it is also referred to as a vehicle herein.

In some instances, the semi-tractor and/or semi-trailer can be vulnerable to tire and/or full wheel theft, where a full wheel refers to a tire mounted on a wheel or a wheel hub that attaches to the axle of the vehicle. Thieves may attempt to steal or replace tires, or full wheels, from the tractor vehicle and/or the semi-trailer. For example, a semi-trailer can be detached from a semi-tractor and stored separately from the tractor vehicle in a remote location, thus can be vulnerable to tire theft activity. As another example, drivers of the tractor vehicles may participate in theft activity occurring with trailers. As a non-limiting example, the driver may provide location information of trailer and information on vulnerable trailers to an individual (e.g., a thief) in order to assist the individual in planning a theft of tires or full wheels. In another non-limiting example, a driver may also be complicit by pulling over to meet a thief for quick tire or wheel theft to occur, allowing the thief to remove the tires and/or wheels and replace with lesser quality tires and/or wheels, and the driver continues the route. As such, tires and full wheels of the tractor vehicles and semi-trailers can be vulnerable to illegal criminal activity because of the unique circumstances related to the use of these vehicles. Accordingly, various embodiments are directed to a need for detecting and classifying tire and/or full wheel theft activity that may arise from semi-tractor vehicles and semi-trailer vehicles.

According to various examples of the present disclosure, a vehicle (e.g., semi-tractor and/or semi-trailer) can be monitored to detect vibrations that may relate to unexpected events, such as theft of one or more tires and/or full wheel assemblies (e.g., tire and wheel). The theft event detection and classification system disclosed herein can be implemented to utilize data collected from sensors on the vehicle and/or tires to classify the type of event. Vehicles, such as semi-trucks, can be equipped with tire sensors mounted on the inside of the tire of each wheel on the vehicle to obtain information regarding physical parameters of the tire, such as, for example, tire pressure, temperature, and the like. Information regarding tire identification can also be provided by RFID tags on the individual tires. In a non-limiting example, a sensor can be implemented to actively scanning for RFID tags to provide valuable tire information in the context of theft. Example implementations of the theft event detection and classification system can include a vehicle computing device configured to detect vibrations and to obtain information from the tire sensors on respective vehicles (e.g., semi-tractor and/or semi-trailers). In the following discussion, a general description of the theft event detection and classification system and its components is provided, followed by a discussion of the operation of the same.

With reference to FIG. 1 shown is a networked environment 100 for systems and methods related to tire and full wheel theft activity according to various embodiments. The networked environment 100 can be operated to detect, identify, and classify theft activity of a vehicle, such as a tractor vehicle 101, a semi-trailer 102, and/or other vehicles. A semi-trailer 102 can be attached to a tractor vehicle 101 to haul freight over ground via roadways and can have tires 110a-110e (collectively referred to as "tires 110" or generically referred to as "a tire 110") equipped with tire sensors 112a-112e (collectively referred to as "tire sensors 112" or generically referred to as "a tire sensor 112"). The tires 110 can comprise pneumatic tires and/or other type of tires in which parameters can be measured. The networked environment 100 includes a computing environment 103, a client device 106, a vehicle computing device 109, and tire sensors 112 which are in data communication with each other via a network 115.

The network 115 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI©), BLU-ETOOTH© networks, microwave transmission networks, as well as other networks relying on radio broadcasts. The network 115 can also include a combination of two or more networks 115. Examples of networks 115 can include the Internet, intranets, extranets, virtual private networks (VPNs), and similar networks.

The computing environment 103 can comprise, for example, a server computer or any other system providing computing capability. Alternatively, the computing environment 103 can employ a plurality of computing devices that can be arranged, for example, in one or more server banks or computer banks or other arrangements. Such computing devices can be located in a single installation or can be distributed among many different geographical locations. For example, the computing environment 103 can include a plurality of computing devices that together can comprise a hosted computing resource, a grid computing resource and/ or any other distributed computing arrangement. In some cases, the computing environment 103 can correspond to an elastic computing resource where the allotted capacity of processing, network, storage, or other computing-related resources can vary over time.

Various applications and/or other functionality can be executed in the computing environment 103 according to various embodiments. The components executed on the computing environment 103, for example, can include a theft detection system 118 and a machine learning service 121, and other applications, services, processes, systems, engines, or functionality not discussed in detail herein. The theft detection system 118 is executed to identify and classify theft activity associated with vehicles (e.g., semi-tractors, semi-trailers, etc.). The machine learning service 121 is executed to train, deploy, and evaluate machine learning models for the identification and classification of theft activity of tires and/or full wheels, and/or other theft or non-theft activities.

Also, various data is stored in a data store 124 that is accessible to the computing environment 103. The data store 124 can be representative of a plurality of data stores 124 as can be appreciated. The data stored in the data store 124, for example, is associated with the operation of the various applications and/or functional entities described below. The data stored in the data store 124 includes, for example, event data records 127, fleet data records 130, and machine learning models data 133, and potentially other data.

The event data records 127 can represent data associated with one or more vehicle computing devices 109 in data communication with the tire sensors 112. The data for the event data records 127 can include data provided by the vehicle computing device 109, derived data generated from the data associated with the vehicle computing device 109, and/or other suitable data. The event data records 127 can include vibration signal information 136, vehicle environment records 139, tire sensor data records 142, and/or other suitable data.

The vibration signal information 136 can represent vibration signals detected by an accelerometer 157 of the vehicle computing device 109. The vibration signal information 136 can include at least one vibration measurement.

The vehicle environment record 139 can represent data associated with theft events and prospective theft events associated with one or more vehicle computing devices 109. The vehicle environment record 139 can include a time stamp for a theft event, a location for theft event, associated sensor data for the theft event, and other suitable data. For example, the vehicle environment record 139 can represent data associated with other sensor devices, such as an accelerometer, a location device (e.g., Global Positioning System, Global Navigation Satellite Systems), and other suitable sensor devices. The vehicle computing device 109 can provide the vehicle environment record 139 to the computing environment 103.

The tire sensor data records 142 can represent data provided by one or more tire sensors 112 attached to individual tires 110 of one or more vehicles. The tire sensor data records 142 can represent data associated with specific vehicle (e.g. tractor 101 and/or trailer 102), including tire identification data, tire sensor data, and other suitable data. The tire identification data can be a unique identifier for each tire associated with the vehicle. The tire sensor data can be measured by tire sensors 112 to provide information such as pressure and/or temperature of the associated tire 110. For example, the tire identification data can include a tire identifier, manufacturing information for the tire 110 (e.g., manufacture name, tire model, etc.), tire size information (e.g., rim size, width, and outer diameter, etc.), manufacturing location, manufacturing date, a treadcap code that includes or correlates to a compound identification, a mold code that includes or correlates to a tread structure identification, and/or other information. The tire identification data can also include a service history or other information to identify specific features and parameters of each tire 110. In some examples, tire identification data can identify a tire position on the vehicle, type of tire, etc. For example, referring to FIG. 1, tires 110a can be identified as steer tires of the tractor 101, tires 110b and 110c can be identified as drive tires of the tractor 101, and tires 110d and 110e can be identified as trailer tires, based at least in part on the tire identification data. While a side view is shown of this non-limiting example, it can be understood that there can be two or more wheels with tires on each axle of a vehicle.

The fleet data records 130 can include data associated with one or more vehicles or vehicle computing devices 109 in a fleet of vehicles. The fleet data records 130 can represent data associated with the tractors 101 and/or trailers 102 of a fleet of freight haulers, such as location, assigned routes, and the like. The fleet data records 130 can include also include a service history of specific vehicles or scheduled service information.

The machine learning models data 133 can represent data associated with machine learning models that are trained, deployed, and evaluated for identifying theft activity. The machine learning models data 133 can include theft classification factors 145, historic data 148, and other suitable data. The theft classification factors 145 can include conditions based on sensor data that can indicate theft or non-theft activity. The historic data 148 can be utilized as a training set for the machine learning service 121 and can be updated, for example with data associated with new event data records 127.

The machine learning service 121 is executed to train, deploy, and evaluate machine learning models for the identification and classification of theft activity of tires and/or full wheels, and/or other theft or non-theft activities. The machine learning models can be used by the theft detection system 118 and/or the theft monitoring application 169. The machine learning service 121 can include, for example, a decision tree classifier, a gradient boost classifier, a Gaussian naïve Bayes classifier, a reinforcement learning algorithm, a logistic regression classifier, a random forest classifier, a decision tree classifier, a multi-layer perceptron classifier, a recurrent neural network, a neural network, a label-specific attention network, an ensemble model, and/or any other type of trained model as can be appreciated. Although the machine learning service 121 can comprise a neural network, it is noted that the computational overhead associated with the neural network can be minimized by implementing a classifier model that is not a neural network.

The client device 106 is representative of a plurality of client devices 106 that can be coupled to the network 115. The client device 106 can comprise, for example, a processor-based system such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 can include a display. The display can comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 can be configured to execute various applications such as a client application 151 and/or other applications. The client application 151 can be executed in a client device 106, for example, to access network content served up by the computing environment 103 and/or other servers, thereby rendering a user interface 154 on the display. To this end, the client application 151 can comprise, for example, a browser, a dedicated application, etc., and the user interface 154 can comprise a network page, an application screen, etc. The client device 106 can be configured to execute applications beyond the client application 151 such as, for example, email applications, social networking applications, word processors, spreadsheets, and/or other applications.

The vehicle computing device 109 can comprise a processor and memory and be attached to a vehicle (e.g., tractor 101 and/or trailer 102). The vehicle computing device 109 can include an accelerometer 157, a location device, a transceiver device 163, sensor(s) 166, and other suitable devices (e.g., other sensors and communication devices). The vehicle computing device 109 can be attached to various locations on the trailer 102, such as near the trailer axles, the trailer frame, the trailer connector, and other suitable locations within a communication range of the tire sensors 112 to receive and store electronic data related to the corresponding tires 110. In some examples, a vehicle computing device 109 can be attached to various locations on the tractor 101 within proximity of the tire sensor(s) 112 corresponding to tire(s) 110 of the tractor 101. In some examples, the vehicle computing device 109 can be embodied as a TPMS of the tractor 101.

The accelerometer 157 can be used to detect movements in various axes of movement and acceleration. For example, the axes can include an X-axis, a Y-axis, and a Z-axis of a Cartesian coordinate system. Each axis of the Cartesian coordinate system can have an acceleration component and a rotation component of measurement. One or more axes can be used by the vehicle computing device 109 to identify theft activity associated with the trailer 102. For example, the accelerometer 157 can be used to detect vibrations which can originate from theft activity. Theft activity can cause vibrations from a powered wrench tool (e.g., an impact gun), a wrench tool (e.g., a crowbar), a hydraulic jack (e.g., an air pressured hydraulic jack), and other suitable theft tools. Additionally, the accelerometer 157 can be used to detect an elevation change of the trailer 102 caused by a hydraulic jack or other theft instruments.

The location device 160 can be used to identify a present location and previous locations (e.g., a location history) of the tractor 101 and/or the trailer 102. A time stamp can be generated for each recorded location of the tractor 101 and/or the trailer 102. The location device 160 can comprise a GPS device, a Global Navigation Satellite System (GNSS) device, and/or other suitable location devices.

The transceiver device 163 can be a communication device for data communication via the network 115. The transceiver device 163 can support one or more wireless communication protocols, such as a cellular protocol, a WIFI protocol, Bluetooth protocol, Zigbee protocol, Z-wave, RFID, 6LoWPAN protocol, and/or other suitable communication protocols.

The sensor 166 can represent other suitable devices that can be used for providing sensor measurement. Some non-limiting examples of sensors can include a microphone, a motion detector, and other suitable sensor devices. For example, a microphone can be used to detect audible sounds of theft activity. The motion detector can be used to detect one or more people in close proximity to particular areas of the trailer 102 (e.g., within a predefined perimeter from the tires of the trailer 102 and/or from the tires of the tractor 101). The sensors 166 can be positioned at various locations on the trailer 102.

The theft monitoring application 169 can be executed to identify theft activity associated with the vehicle (e.g. tractor 101 and/or trailer 102). The theft monitoring application 169 can be in data communication with the computing environment 103 (e.g., theft detection system 118). The theft monitoring application 169 can be used to collect and aggregate sensor data from various sensors (e.g., tire sensors 112, the accelerometer 157, location device 160, and other sensors 166). In some instances, the theft monitoring application 169 can evaluate the sensor data and determine whether to report a prospective theft event.

The tire sensors 112 can be a device used to provide measurements associated with each individual tire of the trailer 102. The tire sensors 112 can be in wireless data communication with the vehicle computing device 109. The tire sensors 112 can provide pressure measurements, temperature measurements, and the suitable measurement. In some examples, the tire sensors 112 can be tire pressure monitoring (TPM) sensors that can have a battery inside for power, as well as a wireless transmitter, which can broadcast data of the measured parameters, such as tire pressure, temperature, etc. The tire sensors 112 can be programmed to send data on a time interval, such as every 30 seconds, 2 minutes, 5 minutes, or other predetermined time interval. In some cases, broadcast of data can be enabled or disabled on demand via a signal or other means. While a TPM sensor is one example of a tire sensor 112, some vehicles can be equipped with other sensors to communicate other data related to the condition of the corresponding tire or vehicle. For example, the tire sensors 112 can be associated with a vehicle, such as a tractor 101 and/or a trailer 102, and in data communication with one or more vehicle computing devices 109.

Next, a general description of the operation of the various components of the networked environment 100 is provided. To begin, an instance of identifying tire theft activity can be described. For example, one or more thieves may desire to replace the new full wheels on a vehicle with full wheels with older tires in order to avoid immediate attention by the owners of the trailer 102 and the driver of the tractor vehicle 101. In this instance, the trailer 102 is equipped with a vehicle computing device 109 that monitors sensor data associated with the trailer 102 and communicates the sensor data to a remote computing device (e.g., a computing environment 103) associated with the owner of the trailer 102. The vehicle computing device 109 can be in data communication with multiple tire sensors 112, such as tire sensors 112 that measure the internal pressure and temperature of a particular tire.

At an opportune time, thieves begin by lifting the trailer 102 up in order to have clearance for removing the tires or full wheels. For example, the thieves may use a hydraulic bottle jack for elevating the trailer 102. While the trailer 102 is being elevated by the hydraulic bottle jack, one or more sensors 166 of the vehicle computing device 109 can be alerted. For example, a first sensor (e.g., accelerometer 157, motion sensor, etc.) can detect the height change of the trailer 102. A second sensor 166 can detect the audible sounds emitting from an operation of a hydraulic bottle jack. The vibrations associated with the activity can be detected by the theft monitoring application 169 and alert the vehicle computing device 109 to wake up, if operating in battery mode, and check for additional conditions of a prospective theft event.

The vehicle computing device 109 can receive additional sensor measurements and determine if the incident should be reported to a remote computing device (e.g., a computing environment 103). In some instances, the vehicle computing device 109 can determine the type of theft activity. For example, the vehicle computing device 109 can capture vibration measurements that are occurring from a powered wrench tool. The thieves may be using the powered wrench tool to quickly remove the lug nuts from the full wheel. The vibration measurements can be used to identify a vibration signature that corresponds to a type of theft activity.

As another example, the vehicle computing device 109 can receive pressure measurements from the tire sensors 112. The pressure measurements can indicate that a rapid loss of pressure is occurring from one or more tires or a loss of data connection to the tire sensors 112. These data indicators can represent another indication of a thief activity because of a tire being removed from the full wheel or the full wheel being taken. The pressure measurements can be used to identify a pressure loss signature that corresponds to a type of theft activity.

As another example, the vehicle computing device 109 can capture vibration measurements that are occurring from a crowbar being used to break a tire seal or pry the tire from the full wheel. In some instances, the vehicle computing device 109 can send these vibration measurements for analysis to identify if the present event is likely a valid theft event and the type of theft event. In other instances, the vehicle computing device 109 can perform the analysis of the sensor data and determine valid theft activity itself. For example, thresholds can be set to determine if a vibration or other sensed aberration is within a range of acceptable activity.

In some examples, the sensor data can be provided to the remote computing device (e.g., a computing environment 103) for analysis to identify whether the sensor data represents a valid theft event. In some examples, the vibrations or other activity can indicate a valid non-theft event, such as vehicle maintenance. For example, the tire sensors 112 of a vehicle may lose communication in an orderly manner, one by one. In some example, this may indicate a maintenance event of replacing tires; however, if the activity is over a shortened or non-standard duration of time, the indication may be a theft event. The theft monitoring application 169 can detect and record potential theft activity. Although shown as part of the vehicle computing device 109, in some examples, the theft monitoring application 169 can be executed in the computing environment 103, receiving sensor data and other information transmitted from the vehicle computing device 109. The theft detection system 118 can identify the activity as potentially theft or non-theft, and classify the type of event. Although shown as part of computing environment 103, in some examples, the theft detection system 118 can be executed on the vehicle computing device 109. In some examples, the theft detection system 118 can include the theft monitoring application 169 and/or machine learning service 121.

Referring next to FIG. 2, shown is a flowchart that provides one example of the operation of a portion of the theft monitoring application 169 according to various embodiments. It is understood that the flowchart of FIG. 2 provides merely an example of the many different types of functional arrangements that can be employed to implement the operation of the portion of the theft monitoring application 169 as described herein. As an alternative, the flowchart of FIG. 2 can be viewed as depicting an example of elements of a method implemented in the computing environment 103 (FIG. 1) according to one or more embodiments.

Beginning with box 203, the theft monitoring application 169 can utilize the accelerometer 157 and other sensors 166 of the vehicle computing device 109 to monitor for vibrations associated with the vehicle. The theft monitoring application 169 can monitor the status of the vehicle, such as whether the vehicle is moving and/or whether it is running or powered by the engine of the vehicle, or vehicle to which it is connected. For example, when the vehicle is a semi-tractor 101, or a semi-trailer 102 connected to a semi-tractor 101, the vehicle computing device 109 can be powered by the running vehicle. When the vehicle is not running, or the semi-trailer 102 is detached from the semi-tractor 101, the vehicle computing device 109 can be powered by a battery back-up. While a theft event is less likely when the vehicle is running and attended, a theft event can occur when the driver is complicit and the running vehicle is pulled over on the side of a road or other location to allow the theft activity. The theft monitoring application 169 can monitor for vibrations when the vehicle computing device 109 is in either a powered or a battery back-up state.

In box 206, the theft monitoring application 169 can capture vibration signals by the accelerometer 157. The vibration signals can include at least one vibration measurement. The vibration measurement can be measured or defined in a three-dimensional space. For example, the vibration measurement can have an acceleration component and a rotation component of measurement. Vibration signals measured about one or more axes can be used by the vehicle computing device 109 to help distinguish unusual activity that may potentially be theft.

In box 209, the theft monitoring application 169 can determine if one or more vibration measurements exceed a threshold. The threshold for the vibration measurements may be different depending on the status of the vehicle. For example, if the vehicle status is parked and computing device 109 is powered by battery back-up, the opportunity for theft activity may be greater, so one or more thresholds for the vibration measurements can be set based on related theft activity. If the vehicle is running and moving, vibrations due to driving activity may be within an acceptable range. However, if the vehicle is running and not moving or parked, a different threshold can be set for acceptable vibration activity. If the vibration measurements are within an acceptable range, the theft monitoring application 169 continues to monitor for activity. In some examples, even if the vibration measurements are within an acceptable range, the vibration signal information 136 can be recorded as part of a data record. If the vibration measurements exceed one or more thresholds, the vibration signal information 136 can be recorded as part of an event data record.

In box 212, the theft monitoring application 169 can capture information related to the vehicle environment. For example, the theft monitoring application 169 can capture a time stamp for an event, a location for the event, duration of the event, associated sensor data for the event, and/or other suitable data. The theft monitoring application 169 can generate vehicle environment record 139 containing information related to the vehicle environment. For example, an overnight timestamp when the vehicle is parked may indicate theft activity.

In box 215, the theft monitoring application 169 can communicate with the at least one tire sensor 112 to retrieve tire sensor information. The theft monitoring application 169 can communicate with the tire sensors 112 which are within the communication range of the vehicle computing device 109. For example, the communication range between the vehicle computing device 109 and a group of sensors can be about three meters. Depending on the vehicle being monitored (e.g., tractor 101 and/or trailer 102), one or more vehicle computing devices 109 can be employed to retrieve the tire sensor information. For example, a first vehicle computing device 109 can be installed on a tractor 101 to monitor the tires on the tractor 101 and a second vehicle computing device 109 can be installed on the trailer 102 to monitor the trailer tires, where the first vehicle computing device 109 and second vehicle computing device 109 can also communicate with each other. Additionally, when a vehicle is parked or not in use, one or more tire sensors 112 can be inactive or a sleep mode. The theft monitoring application 169 can send a signal to the sensors to broadcast the tire sensor information.

In box 218, the theft monitoring application 169 can generate an event data record 127 comprising the vibration signal information 136, a vehicle environment record 139, and tire sensor data records 142 comprising the retrieved sensor information. And in box 221, the theft monitoring application 169 can transmit the event data records 127 to a theft detection system 118. The theft detection system 118 can be executed to analyze the event data record to identify known vibration signatures. The theft detection system 118 can be executed can also classify theft or non-theft activity based the event data record 127. For example, even if the vibration signal information 136 does not initially indicate a theft event, the vehicle environment records 139, tire sensor data records 142, and additional data can be evaluated for theft classification factors 145 classify the event. The theft classification factors can include location of the vehicle, status of the vehicle, status of the tire sensors, sudden pressure drop in tire pressure, duration of the event, change in height of the vehicle, and other data corresponding to the event. Thereafter, this portion of the process proceeds to completion.

Figure 3:
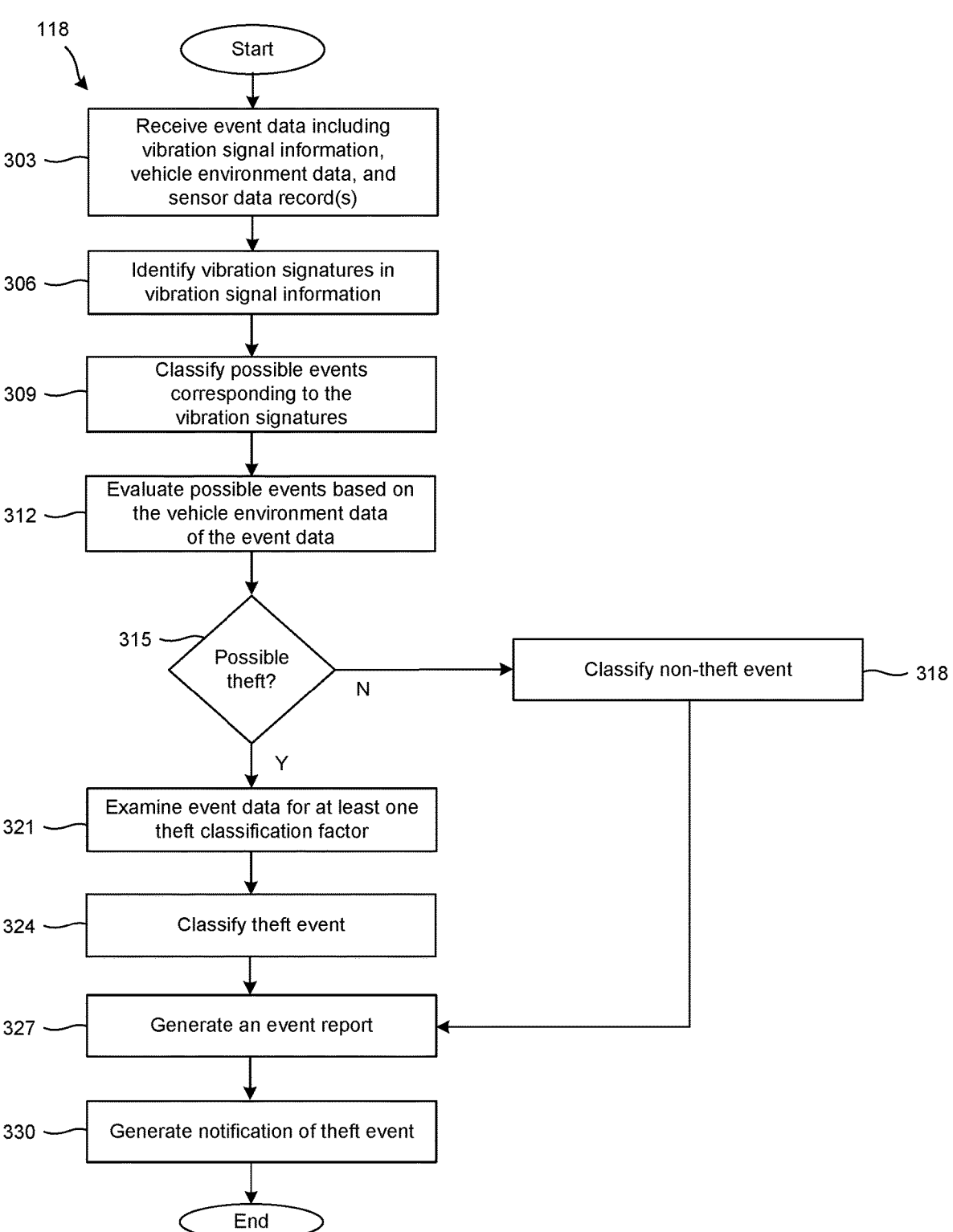
FIG. 3 is a flowchart illustrating one example of functionality implemented as portions of the theft detection system executed in a computing environment in the networked environment of FIG. 1 according to various embodiments of the present disclosure.

Referring next to FIG. 3, shown is a flowchart that provides one example of the operation of a portion of the theft detection system 118 according to various embodiments. It is understood that the flowchart of FIG. 3 provides merely an example of the many different types of functional arrangements that can be employed to implement the operation of the portion of the theft detection system 118 as described herein. As an alternative, the flowchart of FIG. 3 can be viewed as depicting an example of elements of a method implemented in the computing environment 103 (FIG. 1) according to one or more embodiments.

Beginning with box 303, the theft monitoring application 169 can receive event data 127 from a vehicle computing device 109. The event data record 127 can include the vibration signal information 136, a vehicle environment record 139, and tire sensor data records 142 comprising the tire sensor information retrieved from the tire sensors 112. In some examples, the event data record 127 can also include sensor information collected from one or more sensors 166 during an event.

In box 306, the theft monitoring application 169 can analyze the vibration signal information 136 of the event data to identify known vibration signatures. For example, vibration signal information 136 can be analyzed in one or more dimensions to identify vibration signatures that may relate to known activities, including theft and maintenance events. The theft monitoring application 169 can utilize the machine learning service 121 to compare the vibration signal information 136 of the event data record 127 with vibration signatures of known activities based on historic data 148. For example, the vibration signatures of different classes of power tools used for maintenance or theft can be recorded in a controlled environment, identified, and saved in the historic data 148. Additional vibration signatures can also be categorized based on known activities and stored in the historic data 148. In some examples, when the vibration signature is not known, it is possible to identify new activity and add the associated vibration signatures of the event data record 127 to the historic data 148 to increase the training set for the machine learning service 121.

In box 309, the theft monitoring application 169 can determine possible events corresponding to the vibration signatures. The theft monitoring application 169 can provide an initial prediction of a theft event or non-theft event based at least in part on the vibration signatures. If a non-theft event is predicted, further analysis can increase the confidence that the event is routine or due to maintenance. For example, if the vibration signatures indicate a possible maintenance or service scenario, where one or more tires are removed and replaced, the vehicle environment records 139 and/or fleet data records 130 can be evaluated determine if the vehicle location corresponds with a service center and/or a scheduled service of the vehicle. If the type of event cannot be predicted, it can be grouped as a theft event for further evaluation.

In box 312, the theft monitoring application 169 can evaluate the possible events based on the vehicle environment records 139 of the event data records 127. The theft monitoring application 169 can compare the vehicle environment records 139 to evaluate possible service scenarios. For example, the theft monitoring application 169 can compare the vehicle environment records 139 with additional data sources, such as the fleet data records 130, to determine if the vehicle is scheduled to for service. When a potential theft event is expected, the theft monitoring application 169 can further evaluate additional data to increase confidence that the event is related to theft. When a non-theft event is expected, the theft monitoring application 169 can further evaluate additional data to increase confidence that the event is not related to theft. For example, if vibration signature indicates possible maintenance activity, but the vehicle environment records 139 indicate that the event occurred during nighttime hours or away from a service center, the activity may be theft related. In some examples, the fleet data records 130 can also be evaluated to determine if the identified vehicle is scheduled for service or if other know factors apply to the event.

In box 315, the theft monitoring application 169 can predict the event as possible theft event or non-theft event based at least in part on the vibration signatures. When the event is classified as a non-theft event, the event can be further classified as maintenance or another routine. When a potential theft event is expected, the theft monitoring application 169 can further evaluate additional data to increase confidence that the event is related to theft. For example, if the vibration signal information 136 corresponds with a maintenance event and the fleet data records 130 indicate schedule maintenance, the event may be classified as non-theft. The theft monitoring application 169 can compare the vehicle environment records 139 to determine if the time of day or duration of vibrational activity correspond to a maintenance event. However, if the vehicle event records 139 indicate that the vehicle is in a correct location but the time of day is not during the normal operational hours or the duration of the event is not in the range of a routine maintenance service, the event may still be theft related. The theft monitoring application 169 can also compare the vehicle environment records 139 to determine if the vehicle is on or near at projected route of travel.

In box 318, the theft monitoring application 169 can classify a non-theft event. The event can be classified as a maintenance event or other known non-theft activity, such as loading or unloading cargo.

In box 321, the theft monitoring application 169 can further examine the event data for at least one theft classification factor. A theft classification factor can include one or more sensor measurements related to a known activity. For example, one or more vibration signatures of the vibration signal information 136 can be considered in combination with other information. In some examples, the theft classification factor can include vibration signatures related to tools typically used in theft, such as a hydraulic jack to lift at least a portion of the vehicle, an impact gun to remove lug nuts, or a crowbar to remove a deflated tire from the wheel. In other examples, the theft classification factor can include irregular tire sensor data 142, such as a loss of pressure in one or more tire 110. In another example, the theft classification factor can loss of communication with one or more tire sensors 112 or other sensors 166. Other theft classification factors can include time of day, duration of event, location of vehicle, whether the vehicle is parked for an extended period, and other suitable data.

In box 324, when the event is identified as theft, theft monitoring application 169 can classify a known activity. For example, if the vibration signal information 136 has a vibration signature related to the use of a hydraulic jack and/or the accelerometer also indicates a change of height, tire or full wheel theft may be identified. If the vibration signal information 136 has a vibration signature related to the use a wrench tool (e.g., a crowbar) and one or more of the tire sensors 112 have lost pressure, a tire theft may be identified. If the vibration signal information 136 has a vibration signature related to the use a powered wrench tool (e.g., an impact gun) to remove lug nuts, a full wheel theft may be identified. If the tire pressure remains constant, but the elevation of the trailer 102 changes, cargo theft may be identified.

In box 327, the theft monitoring application 169 can generate an event report. When the event has been classified as a theft event (box 324) or non-theft event (box 318), an event report can be recorded. In some examples, the event report can be included as a training set for the machine learning service 121.

In box 336, the theft monitoring application 169 can generate a notification of the possible theft event. In some examples, a notification of a non-event can also be sent. The notification can be sent to a client device 106 such that a notification can be rendered in a user interface 154 by a client application 151. The notification can include an alert signal, for example an audible alert or vibrational alert of the client device. In some examples, if a level of confidence of the theft activity has been determined as high, a notification can be additionally sent to the local authorities. Thereafter, this portion of the process proceeds to completion.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   at least one computing device comprising a processor and memory;
   machine-readable instructions stored in the memory that, when executed by the processor, cause the at least one computing device to at least:
      receive event data from a vehicle computing device, the vehicle computing device attached to a vehicle having at least one tire sensor corresponding to at least one tire on the vehicle, the at least one tire sensor in data communication with the vehicle computing device, the event data comprising vibration signal information and sensor information collected during an event;
      analyze the vibration signal information of the event data to identify known vibration signatures;
      predict the event as possible theft event or non-theft event based in part on the identified vibration signatures;
      examine the event data for at least one theft classification factor, wherein the at least one theft classification factor is based at least in part on the identified vibrational signatures and at least one of a vehicle speed, a vehicle location, a time of day, a duration of the event, a tire pressure, and a status of individual ones of the at least one tire sensor;
      classify the theft event in response to the examination of the event data; and generate a notification of the possible theft event.

2. The system of claim 1, wherein the instructions, when executed by the processor, cause the at least one computing device to further classify a type of theft based on the identified vibration signatures of the event data corresponding to the known vibration signatures associated with at least one of: a tire theft, a full wheel theft, a tire replacement, or other theft.

3. The system of claim 1, wherein the instructions, when executed by the processor, cause the at least one computing device to further classify the theft event to include at least one: theft of a steer wheel, theft of a drive wheel, theft of a trailer wheel, or theft of cargo.

4. The system of claim 1, wherein the instructions, when executed by the processor, further cause the at least one computing device to at least:

compare the event data to supplemental data stored regarding the vehicle; and identify a pattern indicating the possible theft event.

5. The system of claim 1, wherein, in response to the event predicted as a non-theft event, the instructions, when executed by the processor, further cause the at least one computing device to at least analyze additional data to increase confidence that the event is the non-theft event.

6. A method, comprising:

receiving, by at least one computing device, event data from a vehicle computing device, the vehicle computing device attached to a vehicle having at least one tire sensor corresponding to at least one tire on the vehicle, the event data comprising vibration signal information and sensor information collected during an event;

analyzing, by the at least one computing device, the vibration signal information of the event data to identify known vibration signatures;

predicting, by the at least one computing device, the event as possible theft event or non-theft event based in part on the identified vibration signatures;

examining, by the at least one computing device, the event data for at least one theft classification factor, wherein the at least one theft classification factor is based at least in part on the identified vibrational signatures and at least one of a vehicle speed, a vehicle location, a time of day, a duration of the event, a tire pressure, and a status of individual ones of the at least one tire sensor;

classifying, by the at least one computing device, the theft event; and generating, by the at least one computing device, a notification of the possible theft event.

7. The method of claim 6, further comprising classifying, by the at least one computing device, a type of theft based on the identified vibration signatures of the event data corresponding to the known vibration signatures associated with at least one of: a tire theft, a full wheel theft, a tire replacement, or other theft.

8. The method of claim 6, further comprising classifying, by the at least one computing device, the theft event to include at least one: theft of a steer wheel, theft of a drive wheel, theft of a trailer wheel, and theft of cargo.

9. The method of claim 6, further comprising:

comparing the event data to supplemental data stored regarding the vehicle; and identifying a pattern indicating the possible theft event.

10. The method of claim 6, wherein, in response to the event predicted as a non-theft event, and further comprising analyzing additional data to increase confidence that the event is the non-theft event.

11. A system, comprising:

a vehicle computing device comprising an accelerometer, a processor, and memory, the vehicle computing device attached to a vehicle;

at least one tire sensor corresponding to at least one tire on the vehicle, the at least one tire sensor in data communication with the vehicle computing device;

machine-readable instructions stored in the memory that, when executed by the processor, cause the vehicle computing device to at least:

detect vibration signals comprising at least one vibration measurement by the accelerometer;

capture vibration signal information associated with the vibration signals detected;

communicate with the at least one tire sensor to retrieve sensor information;

generate an event data record comprising the vibration signal information, tire sensor records comprising the retrieved sensor information, and a vehicle environment record;

transmit the event data records to a theft detection system;

examine the event data for at least one theft classification factor, wherein the at least one theft classification factor is based at least in part on the identified vibrational signatures and at least one of a vehicle speed, a vehicle location, a time of day, a duration of the event, a tire pressure, and a status of individual ones of the at least one tire sensor; and classify the theft event in response to the examination of the event data.

12. The system of claim 11, wherein, the instructions, when executed by the processor, cause the at least one computing device to further evaluate the at least one vibration measurement based on at least one threshold.

13. The system of claim 12, wherein, the instructions, when executed by the processor, cause the at least one computing device to further, in response to the at least one vibration measurement being greater than the at least one threshold, enable broadcast of data to a remote computing environment.

14. The system of claim 11, wherein, the instructions, when executed by the processor, cause the at least one computing device to communicate with at least a location device on the vehicle; and generate the vehicle environment record comprising a location and a timestamp of the event.

15. The system of claim 14, wherein, the instructions, when executed by the processor, cause the at least one computing device to communicate with at least one additional sensor to determine a status of the vehicle, wherein the vehicle environment record further comprises the status of the vehicle.

16. The system of claim 11, wherein the tire sensor records further comprise previously retrieved tire sensor information.

* * * * *